United States Patent [19]

Takikawa

[11] Patent Number: 4,760,477

[45] Date of Patent: Jul. 26, 1988

[54] DISK CLAMPING MECHANISM FOR A DISK DRIVING DEVICE

[75] Inventor: Makito Takikawa, Furukawa, Japan

[73] Assignee: Alps Electric Co., Ltd., Japan

[21] Appl. No.: 886,206

[22] Filed: Jul. 15, 1986

[30] Foreign Application Priority Data

Jul. 19, 1985 [JP] Japan ............................ 60-111471[U]

[51] Int. Cl.⁴ ........................ G11B 5/016; G11B 17/04
[52] U.S. Cl. .......................................... 360/97; 360/99
[58] Field of Search .................... 360/97, 99; 369/270, 369/75.1

[56] References Cited

U.S. PATENT DOCUMENTS

| | | | |
|---|---|---|---|
| 4,413,294 | 11/1983 | Beijer | 360/99 |
| 4,445,156 | 4/1984 | Fujimoto | 360/99 |
| 4,651,246 | 3/1987 | Becker | 360/105 |

*Primary Examiner*—John H. Wolff
*Attorney, Agent, or Firm*—Guy W. Shoup; Leighton K. Chong

[57] ABSTRACT

A disk clamping mechanism for a disk driving device capable of simultaneously achieving disk centering operation for centering a disk inserted in the disk driving device and disk clamping operation for clamping the disk between a hub and a spindle head for driving the disk, through the swing motion of a door for closing the disk inlet of the disk driving device, comprising: a door plate 17 provided with the door at the free end thereof and urged toward the front of the disk driving device; a swing frame slidably supporting the door plate 17 and urged in the opening direction by spring means; an elastic clamping arm connected at the rear end thereof to the hub so as to press the hub against the spindle head with the disk clamped therebetween; and an adjusting screw screwed in the swing frame so as to be in abutment with the clamping arm 29 to press the clamping arm in the clamping direction when the door is closed by swinging the swing frame. The length of the projecting part of the adjusting screw projecting from the lower surface of the swing arm is adjusted so that the hub is pressed against the spindle head through the clamping arm at an appropriate pressure.

1 Claim, 5 Drawing Sheets

DISK CLAMPING MECHANISM FOR A DISK DRIVING DEVICE

BACKGROUND OF THE INVENTION

1. Field of the Invention

The present invention relates to a disk driving device incorporated into an electronic computer or a word processor for recording information in a disk and reproducing the recorded information and, more specifically, to a disk clamping mechanism for such a disk driving device.

2. Description of the Prior Art

A disk driving device clamps a disk inserted between a hub and a spindle by pressing the hub toward the spindle and rotates the disk by driving the spindle for rotation by means of a motor. Information is recorded in the disk or the information recorded in the disk is reproduced by rotating the disk between a recording-/reproducing head mounted on a carriage movable in the radial direction of the disk and another head or pad attached to a swingable arm swingably joined to the carriage.

FIG. 6 illustrates the constitution of a conventional disk clamping mechanism by way of example. In FIG. 6, there are shown a chassis 40, a door frame 41 connected to the chassis 40 by means of a spring plate 42, a guide pin 43 projected from the door frame 41 perpendicularly to the door frame 41, a hub 44 slidably fitted on the guide pin 43, a compression coil spring 45 provided on the guide pin 43 between the door frame 41 and the hub 44 so as to urge the hub 44 away from the door frame 41, a spindle 46 which is driven for rotation, a disk 47, a carriage 48 capable of reciprocating in the radial direction of the disk 47, a recording/reproducing head 49 mounted on the carriage 48, an arm 50 connected to the carriage 48 by means of a spring plate 51, a pad 52 attached to the extremity of the arm 50 so as to be disposed opposite to the recording/reproducing head 49, a pressure spring 53 urging the arm 50 in the closing direction, and an arm retaining part 54 provided integrally with the door frame 41 and engaging the lower surface of the arm 50 to retain the same.

When the door frame 41 is turned on the spring plate 42 in the closing direction indicated by an arrow A, after inserting the disk 47 into the disk clamping mechanism, the hub 44 is lowered as the door frame 41 is turned, and thereby the disk 47 is aligned correctly with the spindle 46 and the disk 47 is held correctly between the hub 44 and the spindle 46. Since the arm retaining part 54 is lowered as the door frame 41 is turned in the direction of the arrow A, the arm 50 retained by the arm retaining part 54 is turned accordingly by the resilient force of the spring plate 51 and that of the pressure spring 53, so that the disk 47 is pressed against the recording/reproducing head 49 with the pad 52. Thus, disk clamping operation by means of the hub hub 44 and disk pressing operation by means of the pad 52 are achieved simultaneously by turning the door frame 41.

The spring constant and the size of the compression coil spring 45 are designed appropriately so that the hub 44 is pressed against the spindle 46 at an appropriate pressure. However, the actual pressure applied to the hub 44 is often different from the design pressure due to the dimensional allowances in the associated parts and the difference of the actual rigidity of the associated parts from the corresponding design rigidity. An excessive pressure causes the clamped portion of the disk 47 to be worn, while an insufficient pressure causes the disk 47 to slip relative to the spindle 46, and thereby the disk 47 is unable to be driven correctly. Thus, the conventional disk clamping mechanism requires troublesome and different adjustment for adjusting the pressure for pressing the hub 44 against the spindle 46 at a value within a satisfactory range of accuracy.

SUMMARY OF THE INVENTION

Accordingly, it is a technical subject of the present invention to facilitate the adjustment of the disk clamping pressure, to avoid the rapid wear of the clamped portion of the disk, namely, the periphery of the central hole of the disk, and to prevent the slip of the disk relative to the spindle.

In order to achieve the subject of the invention and to solve the problems of the prior art, the present invention provides a disk clamping mechanism for a disk driving device capable of simultaneously achieving disk centering operation for centering a disk 19 by means of a hub 33 and a spindle head 35 and disk clamping operation by means of the hub 33 and the spindle head 35 through the swing motion of a door 3, comprising: a door plate 17 provided with the door 3 at the free end 17a thereof and urged toward the front of the disk driving device; a swing frame 21 slidably supporting the door plate 17 and urged in the opening direction of the door 3; an elastic clamping arm 29 connected to the hub 33 so as to press the hub 33 toward the spindle head 35 and urged in the unclamping direction; and a screw member 25 attached to the swing frame 21 so as to be in abutment with the clamping arm 29 to press the clamping arm 29 in the clamping direction, wherein the length of projection of the screw member below the swing frame 21 is adjustable.

In this disk clamping mechanism, when the open door 3 (FIG. 2) is depressed, the swing frame 21 slidably supporting the door plate 17 holding the door 3 is turned in a counterclockwise direction on a shaft 22. Then, the clamping arm 29 in abutment with the lower end 25a of the screw member 25 screwed in the swing frame 21 is turned on a shaft 30 in a clockwise direction against the resilient force of a conical spring 32, so that the hub 33 joined to the free end 29a of the clamping arm 29 is moved toward the spindle head 35 as illustrated in FIG. 3. The length of the projection portion of the screw member 25 projecting downward from the lower surface of the swing frame 21 is adjusted by turning the screw member 25 to adjust the elastic elastic deformation, namely, the amount of deflection, of the clamping arm 29 so that the hub 33 is pressed against the spindle appropriate pressure.

The above and other objects, features and advantages of the present invention will become more apparent from the following description of a preferred embodiment thereof taken in conjunction with the accompanying drawings.

DESCRIPTION OF THE PREFERRED EMBODIMENT

Figure 1:
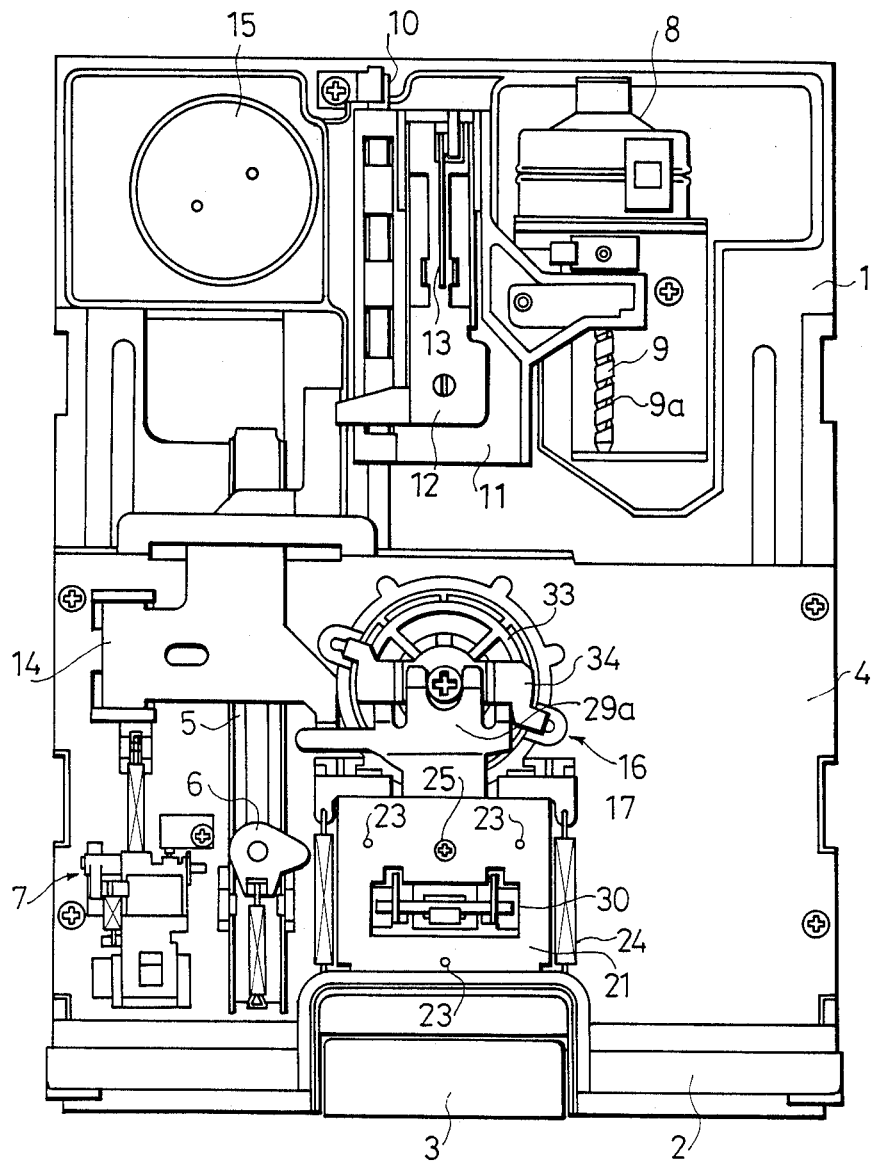
FIG. 1 is a plan view of a disk driving device incorporating a disk clamping mechanism, in a preferred embodiment, according to the present invention.

FIG. 1 illustrates a housing 1 formed by die casting an aluminum alloy or the like, a front panel 2 made of a synthetic resin and fixed to the front surface of the housing 1, a door 3 for closing a disk receiving opening, a lever frame 4 attached to the upper surface of the housing 1, an ejecting pan 5 slidably provided for ejecting a disk on the upper surface of the lever frame 4, a cam 6 rotatably supported on the upper part of the free end of the ejecting pan 5, a write protect device 7 for detecting a write protect notch provided on the jacket of the disk, a stepping motor 8 fixedly provided at the rear right-hand position of the housing 1, a screw shaft 9 attached to the stepping motor 8 and provided with a groove 9a, a guide shaft 10 fixed to the housing 1, a carriage 11 mounted with a magnetic head, not shown, for write writing and reading information, and an arm 12 swingably supported at one end on the upper part of the carriage 11 and resiliently urged toward the carriage 11 by means of a spring 13 to press the disk against the magnetic head in the disk clamping mode.

A block, now shown, attached to the carriage 11 engages the groove 9a of the screw shaft 9. When the stepping motor 8 is turned by a desired steps, the block, hence the carriage 11 is shifted in the radial direction of the disk by a distance corresponding to the rotational displacement of the screw shaft 9. FIG. 1 also illustrates an arm supporting plate 14 which lifts up the arm 12 by the agency of a spring, not shown, when the disk is unclamped, a driving motor 15 which drives a spindle, which will be described later, for rotation through a driving belt, not shown, to rotate the disk, and a disk clamping mechanism 16 interlocked with the door 3, for clamping the disk as the door 3 is closed.

The constitution of the disk clamping mechanism will be described in detail hereinafter with reference to FIGS. 1 to 5.

Figure 4:
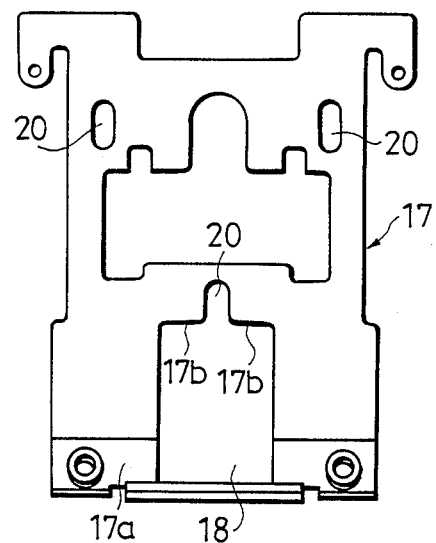
FIGS. 4 and 5 are plan views of a door plate and a swing frame of the disk clamping mechanism shown in FIGS. 2 and 3, respectively.
Figure 5:
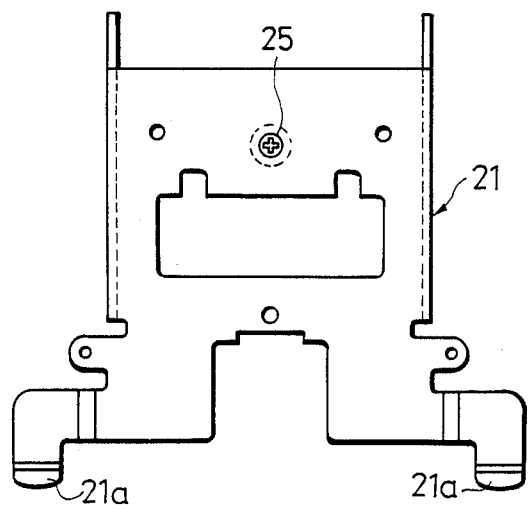
Figure 6:
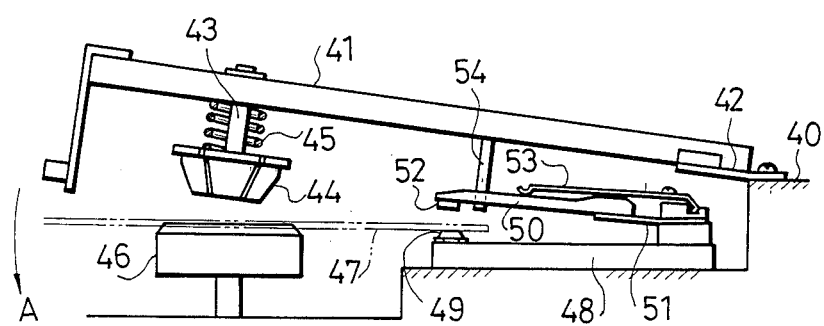
FIG. 6 is a side elevation of a conventional disk clamping mechanism.

Referring to FIG. 4, a door plate 17, to which the door 3 is screwed fixedly, is provided in the front portion thereof with a practically rectangular hole 18; the rear edge of the hole 18 serves as a locking part 17b which engages a locking plate, which will be described later; three slots 20 extending in a disk inserting direction along which a disk 19 is inserted into the disk clamping mechanism are formed at a position in the central portion and at two position near the opposite ends of the rear portion of the door plate 17.

A swing frame 21 is swingably supported at the rear end thereof by a shaft 22 on a lever frame 4 so as to be swingable on the shaft 22. Closing lugs 21a are formed at the front end of the swing frame 21 so as to depend from the opposite ends of the front end of the swing frame 21 to prevent the accidental ejection of the disk 19. Three pins 23 are fixed at a position in the central portion and at two positions near the opposite ends of the rear portion of the swing frame 21 so as to correspond to the slots 20 of the door plate 17, respectively. When the door plate 17 and the swing frame 21 are assembled, the pins 23 extend through the slots 20, respectively. The diameter of the heads 23a of the pins 23 is greater than the width of the slots 20, and hence the door plate 17 is guided by the pins 23 for sliding motion relative to the swing frame 21 along the disk inserting direction and the disk ejecting direction. Extension coil springs 24 are extended between the door plate 17 and the swing frame 21 so as to bias the door plate 17 toward the door 3 relative to the swing frame 21.

An adjusting screw 25 is screwed in the rear portion of the swing frame 21. The adjusting screw 25 is turned with a screw driver or a hexagonal bar wrench to adjust the length of the projecting portion of the adjusting screw 25 projecting from the lower surface of the swing frame 21.

A locking plate 26 is supported rotatably at the upper portion thereof by a shaft 27 on the lever frame 4 so as to be rotatable on the shaft 27. The locking plate 26 is urged counterclockwise, as viewed in FIGS. 2 and 3, by a locking spring 28 disposed between the locking plate 26 and the lever frame 4. The rear edge of the locking plate 26 is shaped in a smooth curve to form a sliding edge 26a along which the locking part 17b of the door plate 17 slides. A recess 26b which engages the locking part 17b is formed in the lower edge of the locking plate 26.

A clamping arm 29 formed of a spring plate is supported at the front end thereof on the lever frame 4 by a shaft 30. The rear portion 29a of the clamping arm 29 extending rearward engages a hub member, which will be described later. A spring 31 is provided between the swing frame 21 and the clamping arm 29 so as to surround the adjusting screw 25 to bias the swing frame 21 upward. A conical spring 32 is disposed between the lever frame 4 and the clamping arm 29 to urge the clamping arm 29 pivotally on the shaft 30 in a counterclockwise direction, as viewed in FIGS. 2 and 3, to urge the swing frame 21 and the door plate 17 through the adjusting screw 25 in the door opening direction in which the door 3 is opened.

Indicated at 33 is a hub for centering and clamping the disk 19. A supporting plate 34 engaging the rear portion 29a of the clamping arm 29 is attached to the upper part of the hub 33.

A spindle head 35 is attached to a spindle 36 rotatably supported in a bearing 37 attached to the housing 1.

Figure 2:
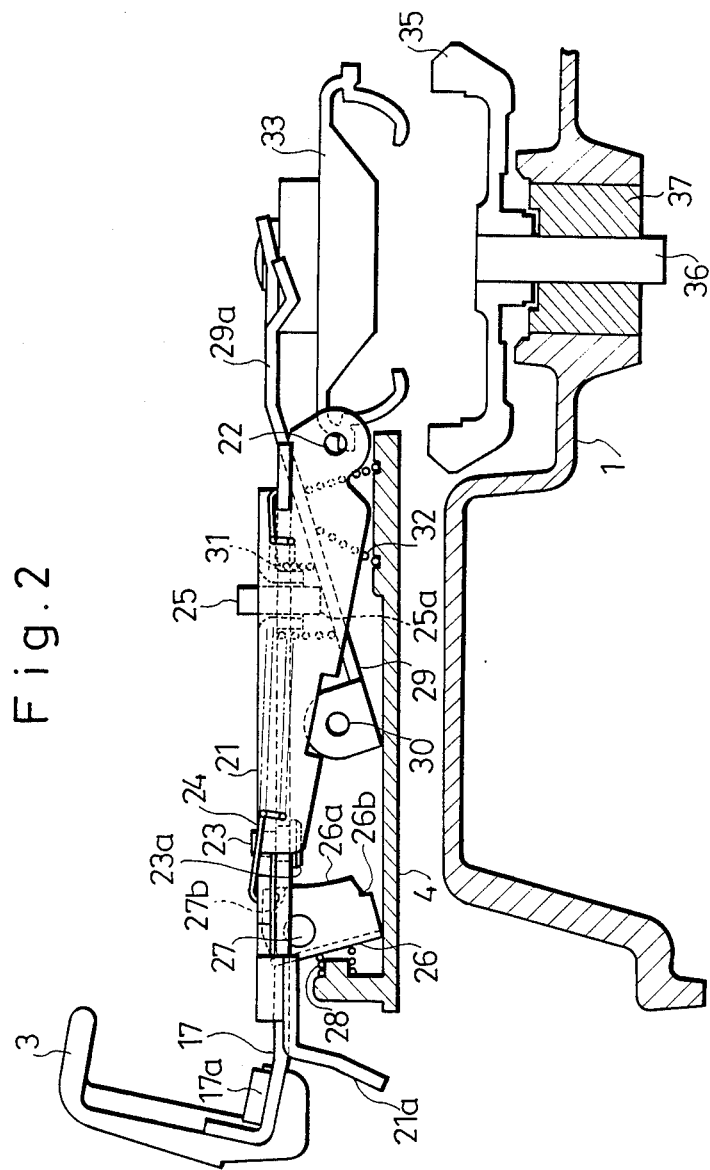
FIGS. 2 and 3 are partially sectional side elevation of a disk clamping mechanism, in a preferred embodiment, according to the present invention.

The action of the thus constituted disk clamping mechanism will be described hereinafter. FIG. 2 shows a state in which the door 3 is opened and the hub 33 is held at an upper position by the clamping arm 29. In this state, the disk 19 is inserted between the hub 33 and the spindle head 35, and then the door 3 is depressed against the resilient force of the conical spring 32. Then, the swing frame 21 supporting the door frame 17 is turned counterclockwise on the shaft 22, and thereby the adjusting screw 25 screwed in the swing frame 21 and in abutment at the lower end 25a with the clamping arm 29 depresses the clamping arm 29, so that the hub 33 supported on the clamping arm 29 is shifted toward the spindle head 35.

As the swing frame 21 is turned counterclockwise, the locking part 17b of the door plate 17 is moved downward sliding along the sliding edge 26a of the locking plate 26 to turn the locking plate 26 slightly clockwise on the shaft 27. When the locking part 17b coincides with the recess 26b, the locking plate 26 is turned counterclockwise by the resilient force of the locking spring 28, so that the locking part 17b engages the recess 26b as shown in FIG. 3.

On the other hand, as the hub 33 is moved toward the spindle head 35, the disk 19 is centered by the hub 33 and, finally, the disk 19 is clamped between the hub 33 and the spindle head 35. The disk clamping action is completed upon the engagement of the locking part 17b with the recess 26b. The clamping pressure corresponds to a resilient force of the clamping arm 29 engaging the hub 33, produced by the deflection of the clamping arm 29 caused by the depression of the clamping arm 29 by the adjusting screw 25. When the adjusting screw 25 is turned clockwise to increase the length of projection of the adjusting screw 25 from the lower surface of the swing frame 21, the deflection of the clamping arm 29 is increased, and thereby the clamping force, namely, the pressure applied to the hub 33 by the clamping arm 29, is enhanced. When the adjusting screw 25 is turned counterclockwise is reduce the length of projection of the adjusting screw 25 from the lower surface of the swing frame 21, the deflection of the clamping arm 29 is reduced, and thereby the clamping force is reduced. Thus, the clamping force can be adjusted to a desired value by turning the adjusting screw 25.

Figure 3:
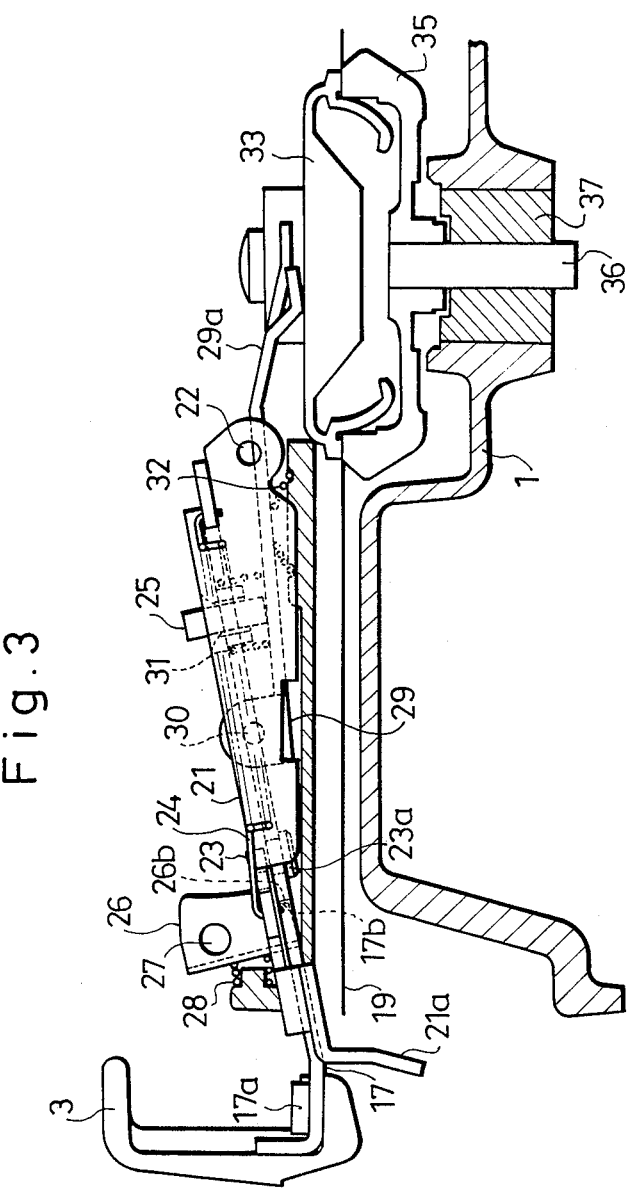

When the door 3 is pushed backward against the resilient force of the extension coil springs 24 in the state shown in FIG. 3, the door plate 17 is moved backward relative to the swing frame 21. As the door plate 17 is moved backward, the locking plate 26 is turned counterclockwise on the shaft 27 by the action of the locking spring 28 until the locking spring 28 expands to its free length. Since the slots 20 formed in the door plate 17 has a sufficient length, the door plate 17 can be moved further backward after the locking spring 28 has expanded to its free length. Thus, when the door plate 17 is pushed backward, the locking part 17b of the door plate 17 is disengaged from the recess 26b. Consequently, the clamping arm 29 is turned counterclockwise on the shaft 30 by the action of the conical spring 32, and thereby the swing frame 21 and the door plate 17 supported on the swing frame 21 are lifted up through the adjusting screw 25.

At the same time, the hub 33 is lifted up by the rear portion 29a of the clamping arm 29 to release the disk 19 from the clamping action of the hub 33 and the spindle head 35. Then, the disk 19 is discharged outside the disk driving device by the ejecting pan 5. Thus the clamping mechanism is restored to the initial disk receiving state as illustrated in FIG. 2.

As apparent from the foregoing description, since the disk clamping mechanism of the present invention has the adjusting screw for adjusting the deflection of the clamping arm, the disk clamping force can be adjusted to an optional value, and thereby the rapid wear of the clamped portion of the disk and the slip of the disk relative to the spindle head are prevented.

Although the invention has been described in its preferred form with a certain degree of particularity, it is to be understood that many changes and variations are possible in the invention without departing from the scope and spirit thereof.

What is claimed is:

1. A disk clamping mechanism for a disk driving device constituted so as to achieve an operation for centering and clamping a disk between a hub and a spindle head through the closing swing motion of a door, comprising: a door plate (17) provided with the door (3) at the free end (17a) thereof, having a locking part (17b) which engages a locking plate (26) when the door (3) is closed, and urged toward a front part of the disk driving device by spring means (24); a swing frame (21) urged so as to be swingable on a shaft (22) in the opening direction of the door (3), and slidably supporting the door plate (17); an elastic clamping arm (29) pivotally supported at the front end on a shaft (30), and engaging the hub (33) at the rear end (29a) so as to depress the hub (33) resiliently when the swing frame (21) is pivoted in the closing direction; and an adjusting screw (25) selectively screwable in the swing frame (21) so that the length of the screw projecting from the lower surface of the swing frame (21) is adjustable and the lower end thereof is in abutment with the elastic clamping arm (29); and a conical spring (32) urging the elastic clamping arm (29) so that the hub (33) is moved away from the spindle head (35), wherein the swing frame (21) is turned together with the door plate (17) on the shaft (22) until the locking part (17b) engages the recess (26b) of the locking plate (26) when the door (3) is depressed to close the disk inlet of the disk driving device, the adjusting screw (25) depresses the resilient clamping arm (29) to press the hub (33) against the spindle head (35) with the disk (19) clamped between the hub (33) and the spindle head (35), and the clamping pressure corresponding to the resilient deflection of the resilient clamping arm can be adjusted to an optional value by regulating the deflection of the resilient clamping arm (29) by turning the adjusting screw (25) clockwise or counterclockwise to adjust the length of the projecting part thereof projecting from the lower surface of the swing frame (21).

* * * * *